April 30, 1940.  H. R. MINOR  2,199,006
SPONGE RUBBER ARTICLE AND METHOD OF MAKING THE SAME
Filed Dec. 1, 1937  2 Sheets-Sheet 1
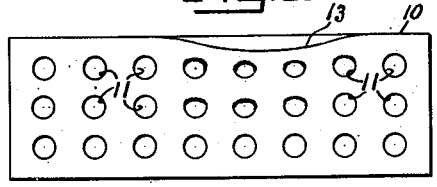
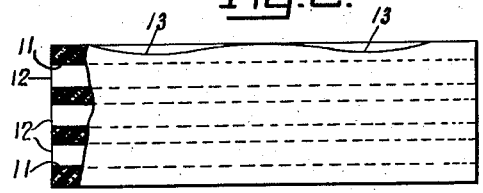
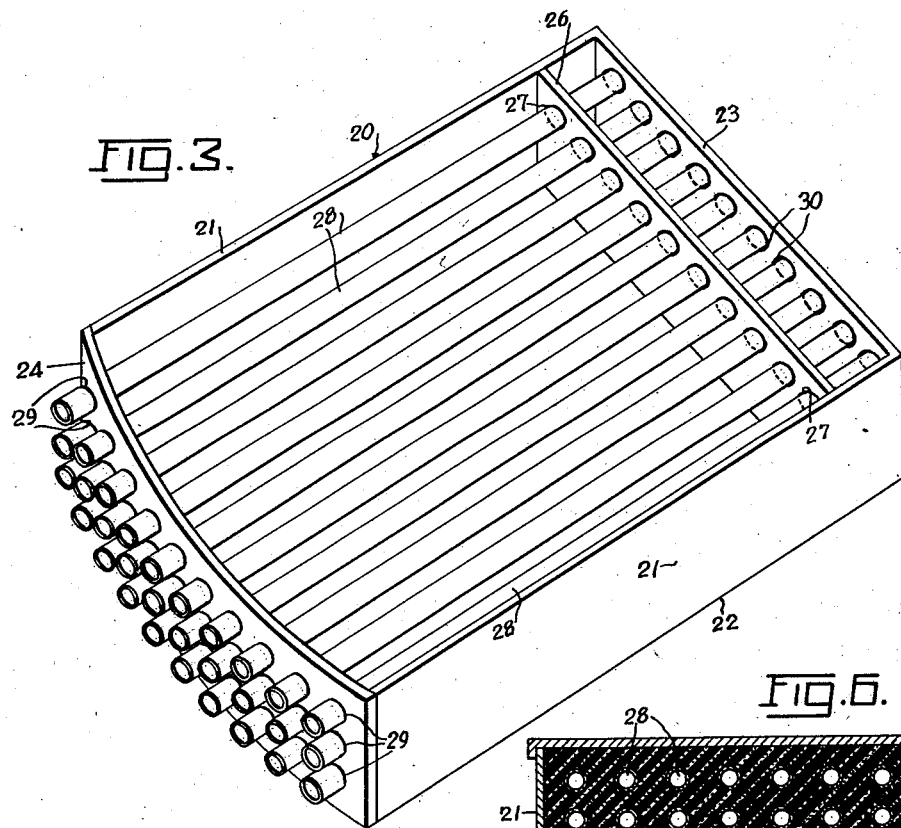
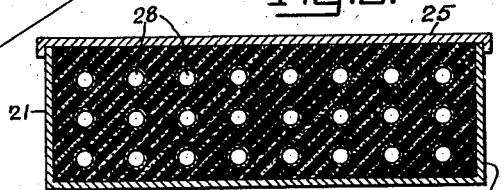
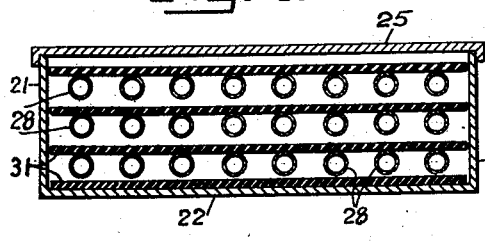
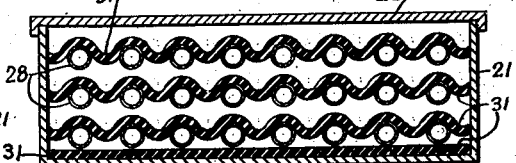
HENRY R. MINOR, Inventor
BY Toulmin & Toulmin
Attorneys

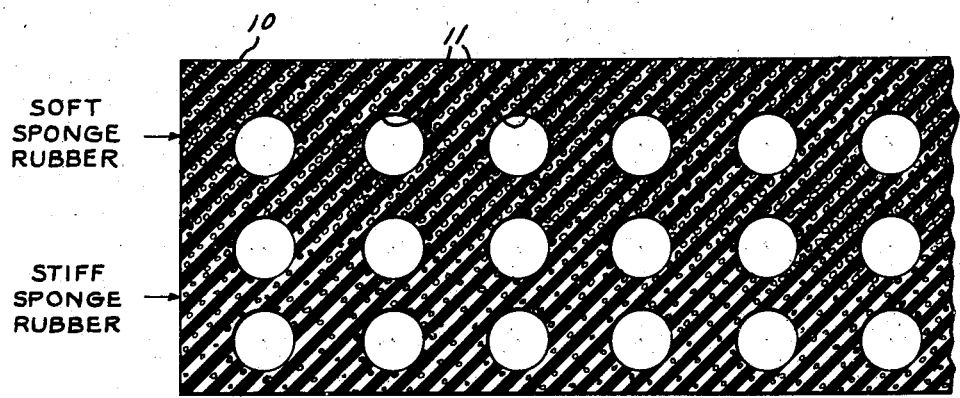
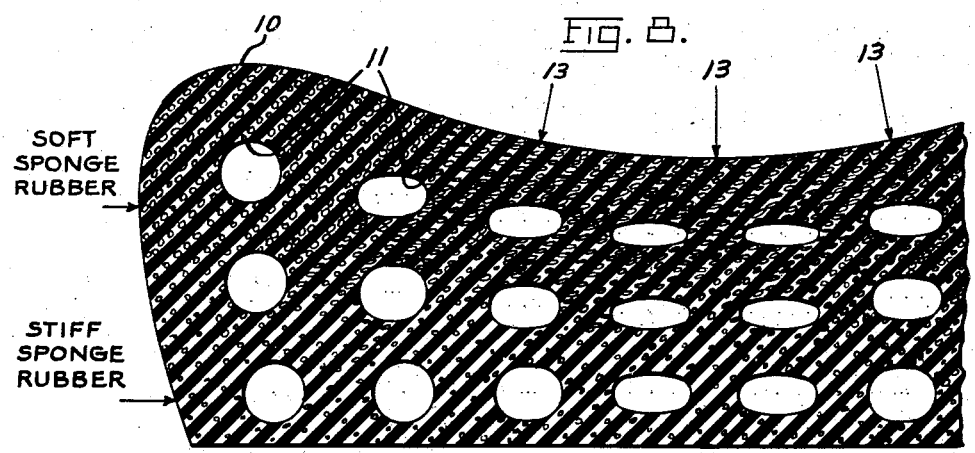

Patented Apr. 30, 1940

2,199,006

UNITED STATES PATENT OFFICE 2,199,006

SPONGE RUBBER ARTICLE AND METHOD OF MAKING THE SAME

Henry R. Minor, Dayton, Ohio, assignor to Industrial Process Corp., Dayton, Ohio, a corporation of New York Application December 1, 1937, Serial No. 177,608

9 Claims. (Cl. 18—53)

This invention relates to rubber articles and methods of making the same, and in particular, to sponge rubber articles and methods of manufacture.

One object of this invention is to provide a sponge rubber article, such as a cushion, having tubular passageways therethrough.

Another object is to provide a sponge rubber cushion-like article having a multiplicity of substantially parallel tubular passageways therethrough, preferably with the ends thereof open.

Another object is to provide a cushion-like sponge rubber article having different characteristics in different layers thereof, such as by having a different porosity or density in one direction than in another direction, the article having tubular passageways therethrough with the ends preferably open.

Another object is to provide a method of making a sponge rubber article having tubular passageways therethrough, wherein the article is built up by placing layers of sponge rubber stock on the bottom of the mold, then successively inserting a layer of rods or pipes and a layer of sponge rubber stock until a stack of rods or pipes and sponge rubber stock has been built up, after which the sponge rubber is expanded in the usual manner to fill in the spaces between the pipes or rods and unite the successive layers of stock in a single sponge rubber article.

Another object is to provide a method of making a sponge rubber article, as described above, wherein different layers of rubber stock are of different characteristics so as to produce a sponge rubber article of varying characteristics in different portions thereof, particularly of varying density or porosity. The thin multiple layers of rubber stock provided by the present invention successfully form the rubber article with tubular passageways therethrough, whereas a single thick layer of rubber batch is impractical for this purpose.

In the drawings:

Figure 1 is a side elevation of a completed sponge rubber cushion, according to the present invention, with a portion thereof depressed, as by the application of a weight thereon.

Figure 2 is a front elevation of the cushion shown in Figure 1.

Figure 3 is a perspective view of one embodiment of apparatus for carrying out the method of this invention for making the sponge rubber article shown in Figures 1 and 2.

Figure 4 is a cross section through the apparatus shown in Figure 3, with the sponge rubber batch layers in position at the start of the molding operation.

Figure 5 is a view similar to Figure 4, but showing the positions of the sponge rubber batch layers shortly after heating has commenced.

Figure 6 is a view similar to Figures 4 and 5, but showing the cross sectional appearance of the completed sponge rubber article in the molding apparatus.

Figure 7 is an enlarged detail sectional view of the sponge rubber cushion illustrated in Figure 1.

Figure 8 is a similar detail sectional view showing the deformation of the upper sponge area resulting when the cushion is subjected to a load. The soft sponged upper section hooves up around the sides of the load giving it extended support, while being rigidly maintained by the bottom less porous rubber section of the cushion.

Referring to the drawings in detail, Figure 1 shows a sponge rubber cushion, generally designated 10, having a multiplicity of tubular passageways 11 therethrough. These tubular passageways are preferably parallel to one another and also preferably have the ends 12 of the passageways 11 open to the atmosphere. The advantage of this construction is that when a heavy body depresses the cushion, as at 13, the sponge rubber portion of the cushion not only will yield in its usual manner, but the passageways 11 will become distorted or flattened and expel some of the air therefrom, and increase the resilience of the cushion. The cushion of Figures 1 and 2 is not necessarily homogeneous, but may have different characteristics in different layers, as hereinafter set forth in more detail. The outer portions, as shown in the enlarged detail views Figures 7 and 8, may have different densities or porosities than the inner portions. In this manner the surface portions of the cushion 10 may be given characteristics for improving the appearance of the article, as well as for providing a suitable surface for the application of trademarks, identifying data or designs.

A preferred apparatus for making the cushion of Figures 1 and 2 is shown in Figure 3, and consists of a molding apparatus, generally designated 20, having relatively thin side walls 21, a bottom wall 22 and end walls 23 and 24. The walls 21 to 24, inclusive, are preferably of thin sheetmetal, the provision of a top 25 being optional. The showing of the molding apparatus 20 is diagrammatic in the several views. Arranged within the molding apparatus 20 is a partition 26 having a plurality of apertures 27 for the admission and support of rods or pipes 28. For purposes of simplification only the top layer of rods or pipes is shown within the apparatus 20, the mid-portions thereof being broken off immediately after passing through the end wall 24. Similar apertures 29 are provided in the end wall 24. The apertures 27 and 29 are slightly larger than the rods or tubes 28 so as to provide a loose, sliding fit therebetween. Preferably also the end wall 23 is provided with apertures 30 for the passage of the outer ends of the rods or pipes 28.

The end wall 24 is removable from the apparatus so that the pipes 28 may be temporarily supported solely by the partition 26 cooperating with the end wall 23. In this manner the successive layers of sponge rubber batch may be conveniently inserted before the end wall 24 is placed in position. The ends of the pipes 28 may be beveled, if desired, to facilitate their admission to and passage through the various apertures 27, 29 and 30. The pipes 28 are preferably of metal with a plated coating, tending to render them non-adhesive to the rubber, such a plated coating as chromium, cadmium or the like being found suitable for this purpose. The pipes may optionally be coated with talc, or other suitable substance, reducing the sticking of the sponge rubber to the pipes.

By providing the partition 27 the pipes 28 may be centered and supported so that it is unnecessary to thrust the pipes through the assembly of layers of rubber stock. This construction eliminates the scraping of the coating of the pipes, or the marring of the pipe surfaces, and enables the rubber batch layers to be placed in position, one layer at a time, followed by a layer of pipes, then another layer of rubber batch, etc. until the molding apparatus 20 has been filled. This prevention of the marring of the pipes keeps their surfaces in perfect condition, and facilitates the withdrawal of the pipes from the rubber article after the manufacturing process has been completed.

It has been discovered that if rubber stock be laid on horizontal supports, such as the metal tubes 28 shown on the drawings, and that if a body be built up of alternate tubes and rubber stock in a spaced relation similar to that shown in Figures 4 and 5, it is possible to secure a uniform sponge cushion product, which it has not heretofore been possible to make. This is accomplished by supporting the rubber sheet in the manner explained and applying heat to soften and expand the rubber stocks to ultimately unite the layers into a single body. Hence, the expansion of each sheet takes place independent of every other sheet and consequently is not under the imposition of having to raise the weight of superimposed rubber.

It has been common practice heretofore to make rubber sponge products several inches thick from a mass or sponge stock wherein the blowing ingredients were a part of the stock itself. By this method, however, it has not been possible to make a satisfactory sponge cushion due to the difficulty encountered in raising the weight of rubber with the relatively small pressure of gas generated by heat, which results in a non-uniformly sponged product. Additional difficulty is brought about by the fact that any attempt to separate the sheets of rubber was futile because of the necessity of applying heat before any blowing or sponging action could take place, resulting in the slumping of the rubber stock all in the bottom of the mold. This invention, however, provides a method wherein these drawbacks are overcome by providing supports which permit each sheet of rubber to expand independently of the other and said expansion takes place before the application of sufficient heat to cause the sheets to slump due to flow and gravity.

In the method of making the rubber article shown in Figures 1, 2, 7 and 8 a layer 31 of suitable sponge rubber stock is placed upon the bottom 22 of the molding apparatus 20, with the end wall 24 thereof removed. The lowermost layer of the pipes 28 is then inserted, the pipes being caused to pass through the apertures 27 and 30, and thereby to be supported at one end. A second layer 31 of rubber batch is then laid upon the first layer of pipes 28, after which a second layer of pipes 28 is inserted in the same manner. This procedure is repeated until the desired number of alternate layers of pipes 28 and rubber batch layers 31 have been provided. The removable end 24 is then placed in position, with the ends of the pipes 28 passing through the apertures 29 therein. The top 25, if used, is then placed in position and the assembly placed in an autoclave and subjected to the usual processes of heating and expanding the rubber.

As the rubber is heated during the early part of the procedure, it droops and assumes the position shown in Figure 5. The different batch layers 31 thus present, in cross section, an undulating appearance excepting, of course, bottom layer 31, which is supported by the bottom wall 22 of the molding apparatus 20. When the heating and expansion have been carried still further, the successive batch layers expand into engagement with one another, thereby filling the spaces between the pipes 28, and presenting the cross sectional appearance shown in Figure 6. By this method of using alternate layers of rubber batch and pipes, it is possible to obtain a sponge rubber article of any thickness desired, yet with a substantially constant density throughout, a problem which has hitherto presented great difficulties in the sponge rubber art. By varying the characteristics of the different layers 31 it is also obviously possible to vary the density or porosity of the resulting article 10. It is further possible to apply layers having different color characteristics, or different surface characteristics for the application of identifying data, trade marks or designs. When the expansion and heating have been completed, the rods or pipes 28 may be removed by withdrawing them axially from the sponge rubber article 10, and the latter removed from the molding apparatus 20. The designs or trade marks may be slightly embossed in the surface by placing a thin layer thereof on top of the uppermost layer 31, and permitting the design or color layer to unite with the other layers by the usual heating and vulcanizing procedure.

It will be understood that I desire to comprehend within my invention such modifications as come within the scope of the claims and the invention.

Having thus fully described my invention, what I claim as new and desire to secure by Letters Patent, is:

1. A method of making sponge rubber cushions which comprises placing a layer of rubber stock in a molding enclosure, placing a layer of horizontal tubes above said stock in a spaced relationship thereto, superimposing upon said horizontal tubes another layer of sponge stock, placing said mold and rubber stocks in a closed vessel and applying heat to soften and expand the rubber stock and unite the successive layers and continuing the application of heat whereby to bring about the formation of an integral sponge cushion having horizontal tubular passageways therethrough.

2. A method of making a sponge rubber cushion which comprises placing a layer of rubber stock in a molding enclosure, disposing a layer of horizontal tubes above said stock in a spaced relationship thereto, superimposing upon said horizontal tubes another layer of sponge stock compounded so as to be softer than the bottom layer, placing said mold and rubber stocks in a closed vessel and applying heat to expand the rubber layers to fill the mold, and continuing the application of heat whereby to bring about the formation of an integral sponge cushion having horizontal tubular passageways therethrough and having a softer upper section than lower section.

3. A method of making a sponge rubber cushion which comprises supporting individual layers of rubber stock apart from one another upon spaced tubular members in a molding enclosure, placing said mold and rubber stocks in a closed vessel and applying heat to expand the rubber layers while releasing any gas evolved thereby and continuing the application of heat expanding the layers of rubber together whereby to bring about the formation of an integral sponge cushion having horizontal tubular passageways therethrough.

4. A method of making sponge rubber cushions which comprises supporting layers of rubber stock of different degrees of softness when cured, apart from one another upon horizontally and vertically spaced rods in a molding enclosure, placing said mold and rubber stocks in a closed vessel and then applying heat and substantially concomitantly therewith releasing any pressure of gas formed and continuing the application of heat expanding the layers of rubber together whereby to bring about the formation of an integral sponge cushion having horizontal tubular passageways therethrough and having a softer upper section than lower section.

5. In a method of making a sponge rubber cushion, supporting multiple layers of rubber sheet stock upon horizontally and vertically spaced tubular members, softening and expanding said superimposed layers of rubber together to produce a uniform integral sponge rubber cushion having horizontal open-end tubular passageways therethrough.

6. The method of making sponge rubber articles comprising simultaneously softening and expanding superimposed separate sponging rubber bodies and causing them ultimately to unite in a single body of sponge rubber while supporting said individual bodies upon horizontally and vertically spaced tubular members to concomitantly form elongated openings therethrough.

7. As an article of manufacture, a sponge rubber cushion comprising an integral sponge rubber body having an outer and inner portion of different porosity, said outer portion being softer than said inner portion and said rubber body having horizontally and vertically spaced open end tubular passageways disposed throughout said body.

8. As an article of manufacture, a sponge rubber cushion comprising a single integral sponge rubber body having an outer and inner portion of different porosity, said outer portion being softer than said inner portion and adapted to move up around the sides of a load applied to said cushion to give it extended support, said rubber body comprising horizontally disposed spaced open end passageways therethrough.

9. As an article of manufacture, a sponge rubber cushion comprising an integral body having outer and inner portions of different softness, said outer portion being softer than said inner portion, and the body of said cushion comprising horizontally and vertically disposed open end passageways for increasing the resiliency of said cushion.

HENRY R. MINOR.